United States Patent
Schaedlich et al.

(10) Patent No.: US 6,170,904 B1
(45) Date of Patent: Jan. 9, 2001

(54) MOTOR VEHICLE WITH A REAR-MOUNTED AIR GUIDE DEVICE

(75) Inventors: Guenter Schaedlich, Weil der Stadt; Georg Erdelitsch, Bietigheim-Bissingen; Walter Haecker, Tamm, all of (DE)

(73) Assignee: Dr. Ing. h.c.F. Porsche AG, Weissach (DE)

( * ) Notice: Under 35 U.S.C. 154(b), the term of this patent shall be extended for 0 days.

(21) Appl. No.: 09/092,002

(22) Filed: Jun. 5, 1998

(30) Foreign Application Priority Data

Jun. 5, 1997 (DE) .............................................. 197 23 518
Sep. 19, 1997 (DE) .............................................. 197 41 321

(51) Int. Cl.⁷ .................................................. B64C 3/58
(52) U.S. Cl. ...................................... 296/180.1; 180/903
(58) Field of Search .............................. 296/180.1, 180.2, 296/180.3, 180.4, 180.5; 52/894; 114/273; 180/903

(56) References Cited

U.S. PATENT DOCUMENTS

| 2,932,370 | * | 4/1960 | Kraus et al. | 192/219 |
|---|---|---|---|---|
| 3,623,745 | * | 11/1971 | Taylor | 280/124 |
| 4,174,863 | * | 11/1979 | Gotz | 296/1 S |
| 4,738,479 | * | 4/1988 | Filtri et al. | 196/1 S |
| 4,773,692 | * | 9/1988 | Schleicher et al. | 296/1 S |
| 5,120,105 | * | 6/1992 | Brin et al. | 296/180.5 |
| 5,165,751 | * | 11/1992 | Matsumoto et al. | 296/180.5 |

FOREIGN PATENT DOCUMENTS

| 28 51 639 A1 | 6/1980 | (DE) . | |
|---|---|---|---|
| 88 01 032 | 1/1988 | (DE) . | |
| 4020064 | * 1/1992 | (DE) | 296/180.5 |
| 43 05 090 C2 | 4/1995 | (DE) . | |
| 0 242 681 A2 | 10/1987 | (EP) . | |
| 2624823 | * 6/1989 | (FR) | 296/180.1 |
| 2-6281 | 1/1990 | (JP) . | |
| 2-95988 | 4/1990 | (JP) . | |

* cited by examiner

Primary Examiner—D. Glenn Dayoan
Assistant Examiner—Paul Chenevert
(74) Attorney, Agent, or Firm—Evenson, McKeown, Edwards & Lenahan, P.L.L.C.

(57) ABSTRACT

A motor vehicle is provided with a rear-mounted air guide device having a rear spoiler provided on a hood at the rear and a connected rear airfoil. The rear airfoil is used only when needed to produce the necessary downforce so that no damage occurs to the air guide device when passing through an automatic car wash. For that purpose, the rear airfoil is movable by a drive device from a retracted resting position into an extended operating position and vice versa. The rear airfoil in the resting position is largely lowered into a groove-shaped receptacle provided on the top of the rear spoiler.

20 Claims, 8 Drawing Sheets

MOTOR VEHICLE WITH A REAR-MOUNTED AIR GUIDE DEVICE

BACKGROUND AND SUMMARY OF THE INVENTION

This application claims the priority of German application 197 23 518.2, filed Jun. 5, 1997, the disclosure of which is expressly incorporated by reference herein.

The present invention relates to a motor vehicle with a rear-mounted air guide device composed of a rear spoiler provided on a rear-mounted hood and a rear airfoil connected therewith.

DE-GM 88 01 032 describes an air guide with a rear airfoil, a rear spoiler, and a hood assembled to form a prefabricated unit. The rear airfoil, which is fixed and located at the top, is connected so that a narrow flow channel is formed with respect to the rear spoiler located beneath.

This known arrangement has the disadvantage that the rear airfoil assumes its operating position even at low road speeds, at which it is not required for producing a downforce on the rear axle. There is also the danger that the air guide device, with its rear airfoil projecting relatively far upward, will be damaged by the washing brushes when passing through an automatic car wash.

An object of the present invention is to provide an improved rear-mounted air guide device with a rear spoiler and a rear airfoil such that the rear airfoil is deployed only when it is necessary to produce the necessary downforce and no damage to the air guide device occurs when going through an automatic car wash.

This object has been achieved according to the present invention by providing that the rear airfoil can be moved by a drive device from a retracted resting position into an extended operating position and vice-versa, with the rear airfoil in resting position being largely lowered into a groove-shaped receptacle provided on the top of rear spoiler.

The primary advantages achieved with the invention include the fact that, as a result of its movable configuration, the rear airfoil assumes a retracted resting position at relatively low road speeds, in which it cannot be recognized as a rear airfoil. Only at higher road speeds at which a higher downforce on the rear axle is required is the rear airfoil moved into its deployed operating position by a motor drive device.

The drive device comprises a central drive motor, two flexible drive shafts, and two telescoping extenders that support the rear airfoil. Each telescopic extender has at least one outer tube held in place on the rear spoiler and an inner tube connected with the rear airfoil. The inner tube is in an operating connection through a spindle drive with the outer tube.

In the retracted resting position of the rear airfoil, the top of the rear airfoil forms the area exposed to the flow over the rear. With the rear airfoil retracted, the danger is reduced that the brushes of the car wash will become jammed in the air guide device as it passes through an automatic car wash, thereby damaging the air guide device.

According to a first embodiment of the telescopic extender of the present invention, the outer tube is fixed and the inner tube connected with the rear airfoil executes a linear displacement movement. The drive device engages the lower edge of the outer tube. The two end positions of the inner tube are controlled by microswitches with endposition recognition.

A second embodiment of the telescopic extender provides a rotary movement of the outer tube. The drive device engages in the vicinity of an upper mount, with the drive shaft driving a worm wheel of the outer tube through a worm shaft. This version of the telescopic extender requires less space vertically.

The worm gear transmission produces a better torque conversion and the torque is produced where it is required. The drive shafts can be made simpler and thinner in cross section. The rotary movement of the outer tube and the linear displacement movement of the inner tube avoids the so-called slip-stick effect between the two tubes, which occurs with simple sliding guides.

Two reed contacts are provided for detecting the end positions, these contacts being mounted outside the outer tube. These reed contacts are actuated with zero contact by a permanent magnet mounted on the inner tube. Because the inner tube, in contrast to the outer tube, does not move, exact switching of the reed contact in the end position is always guaranteed with this arrangement, so that a control connected with the reed contacts can reliably move the telescopic extender.

In a further improvement, the reed contacts are soldered together with a plug on a board which simultaneously forms the electrical connection between the plug and the reed contacts. The board is held in a cavity in the holder so that as to be protected against corrosion. By mounting the reed contacts on the board, the reed contacts are simultaneously held in position and connected electrically with the plug, thereby eliminating separate installation.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
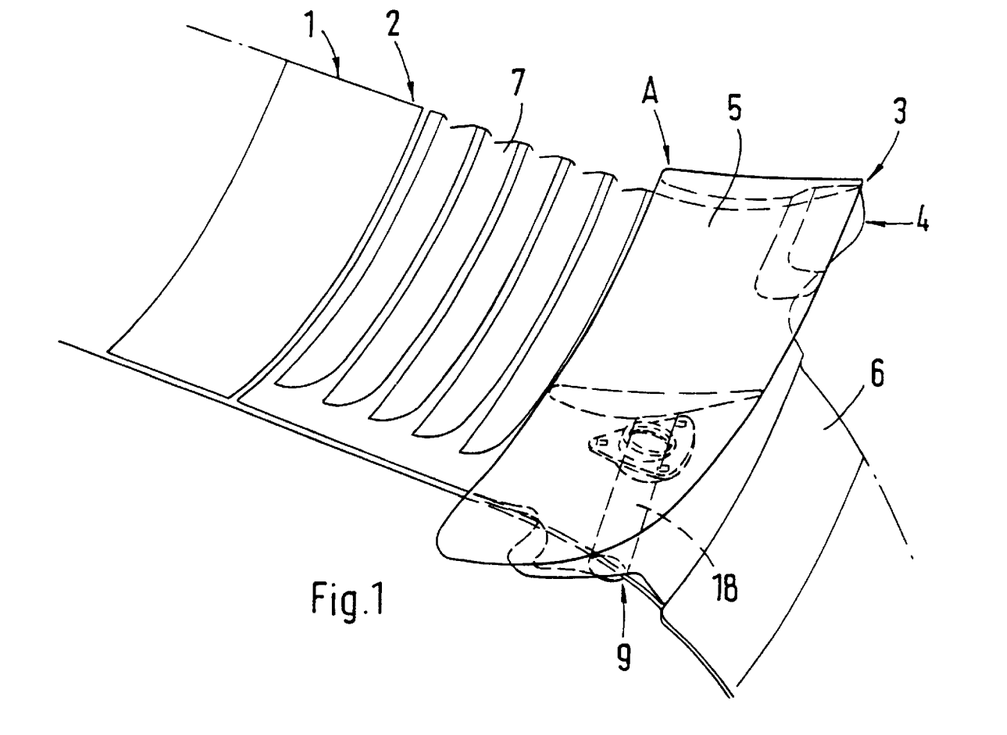
FIG. 1 is a partial perspective view diagonally from the rear of the rear area of an automobile with an air guide device, with only one half of the rear area and the air guide device being shown and with the rear air foil in its retracted resting position.

A motor vehicle 1, e.g. an automobile (shown partially) has a fastback 2 with a rear air guide device 3 having a fixed rear spoiler 4 mounted on the top of the vehicle rear and a rear airfoil 5 connected therewith. The rear spoiler 4 is located at the rear end of a hood 6 on the vehicle rear and in the embodiment of FIG. 1 is integral with the hood 6. A cooling air grid 7 with a plurality of air inlet openings 8 is located in front of the rear spoiler 4 on the hood 6.

Figure 2:
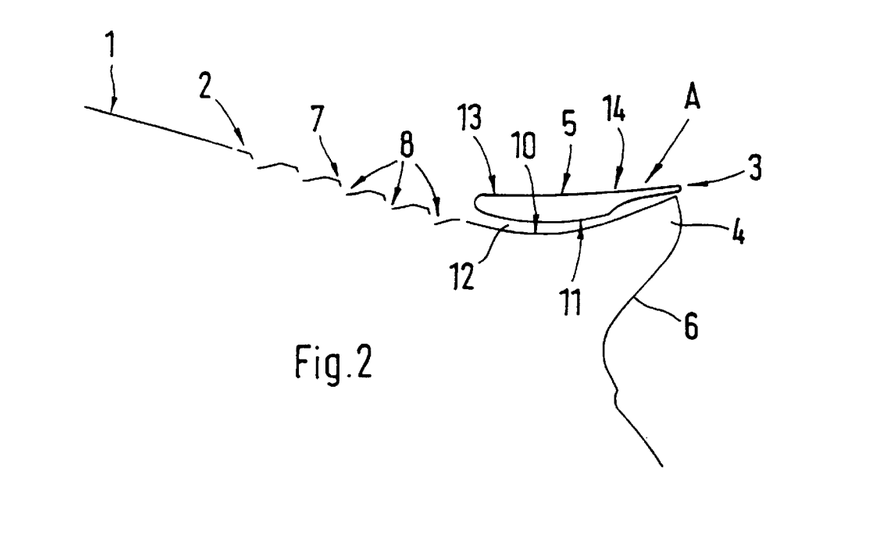
FIG. 2 is a central section through the rear area shown in FIG. 1 and the air guide device.
Figure 3:
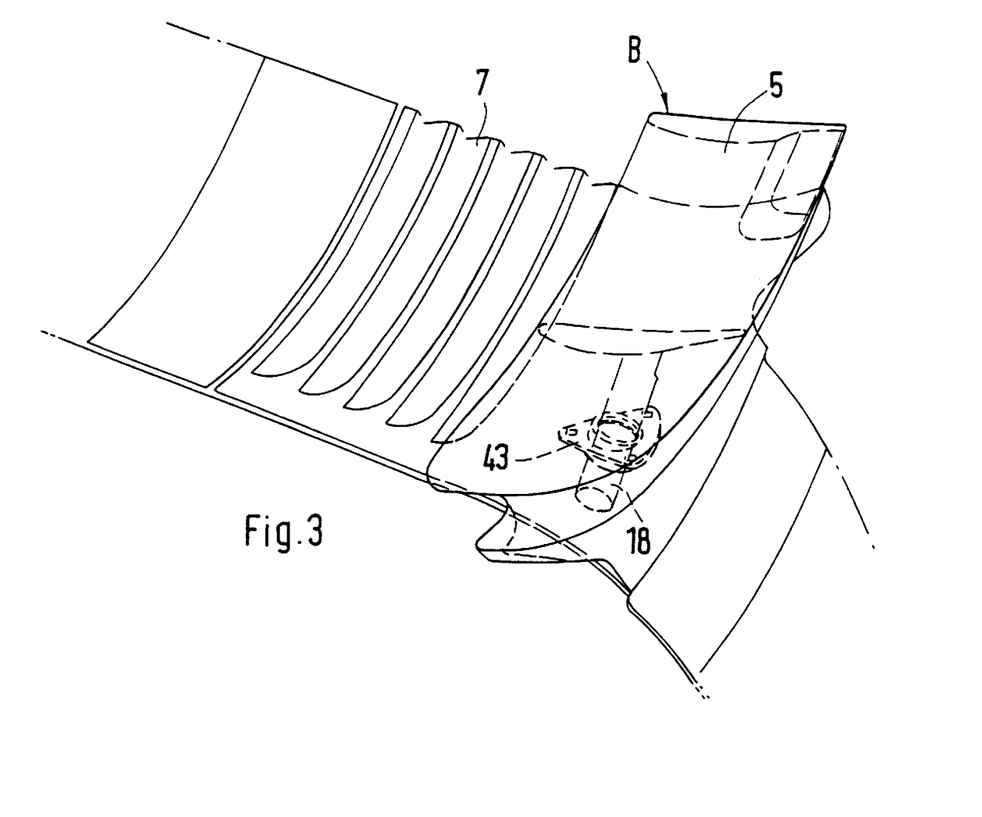
FIG. 3 is a perspective view corresponding to FIG. 1 but with the rear airfoil extended.
Figure 4:
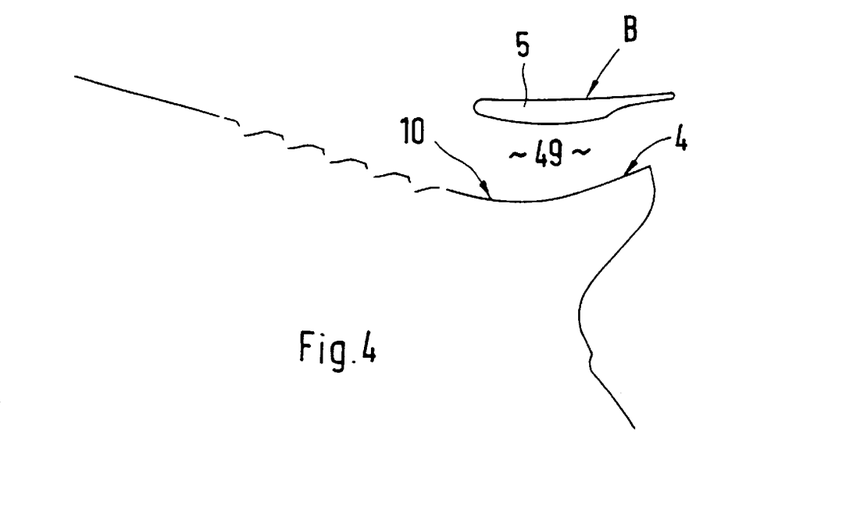
FIG. 4 is a central section through the air guide device shown in FIG. 3.

The rear airfoil 5 can be displaced by a drive device designated generally by numeral 9 from a retracted resting position A (FIGS. 1 and 2) into an extended operating position B (FIGS. 3 and 4) and vice versa. The rear airfoil 5 in its resting position A is received in a groove-shaped receptacle 10 provided on top of the rear spoiler 4.

In the retracted resting position A, the bottom 11 of the rear airfoil 5 is located in that it forms a narrow gap 12 with respect to the beneath receptacle 10 of the rear spoiler 4, and the top 13 of the rear airfoil 5 forms the surface 14 subjected to the air flow over the rear. The gap 12 prevents damage to the painted outer surfaces of the rear spoiler 4 and the rear airfoil 5. The drive device 9 (FIG. 5) comprises an electric drive motor 15 located approximately centrally in the transverse direction of the vehicle, with two outputs 16, 16'. One end of a flexible drive shaft 17, 17' is brought out of each output 16, 16', and the other external end of each drive shaft is connected with a telescopic extender 18, 18' which supports the rear airfoil 5.

The two spaced telescopic extenders 18, 18' hold the rear airfoil 5. Each telescopic extender 18, 18' includes at least one fixed outer tube 19 and an inner tube 20 which is displaceable vertically. The outer tube 19 is fastened to the fixed rear spoiler 4 and the inner tube 20 is connected with rear airfoil 5. The outer tube 19 is held in place at its upper marginal area on the rear spoiler 4 with interposition of an upper retaining part 21. A cylindrical portion 22 of the holding part 21 is pushed externally onto the upper marginal area of the outer tube 19 and is permanently attached thereto by clamping or the like. A retaining plate 23 connected with the cylindrical section 22 abuts a contact surface of the rear spoiler 4. The retaining part 21 is secured by a plurality of screws 24 which are screwed into inserted threaded plates 25 in the rear spoiler 4. A wiper ring 26 with an elastic sealing lip 27 is located between the upper retaining part 21 and the outside of inner tube 20.

A spur gear drive 28 with a multi-part transmission housing 29 is flanged to the lower edge of the outer tube 19. A pinion 30 is permanently attached to the flexible drive shaft 17, 17' meshing with a gear 31 which is connected in a force-transmitting manner with an upright spindle 32. The spindle 32 cooperates with a lifting nut 33 mounted internally on inner tube 20. The lifting nut 33 is inserted from below into inner tube 20 and in the embodiment is held in place by a screw connection. The spindle 32 is turned into an internally threaded section 34 of the lifting nut 33. The lower end of upright spindle 32 is rotatably mounted both on the housing upper part and on the housing lower part 36. Spacing bushings 37, 37' and elastic bearings 38, 38' are interposed locally between the outer tube 19 and the inner tube 20.

The two spaced elastic bearings 38, 38' namely in the vicinity of the upper retaining part 21 and in a middle area of the vertical extent of the outer tube 19. Each elastic bearing 38, 38' comprises a slotted bearing bushing 39 pushed onto the inner tube 20. A rubber ring 41 is inserted into an external turned groove 40 in the bearing bushing 39. The ring 41 cooperates in a sliding manner with the inside of the outer tube 19. The elastic bearing 38, 38' compensates for tolerances and ensures that the system is free of play.

The inner tube 20 has a greater length and hence a greater vertical extent than the outer tube 19. A mounting part 43 is inserted into a projecting locally flattened upper end area 42 of the inner tube 20. A plate-shaped section 44 of mounting part 43 is connected with the rear airfoil 5. The plate-shaped section 44 is mounted by screws 45 which are turned into an embedded, threaded plate 46 in the rear airfoil 5. A section 47 of the mounting part 43, which is inserted into the inner tube 20, is adjustably connected with inner tube 20 at 48 by releasable fastening elements.

Figure 7:
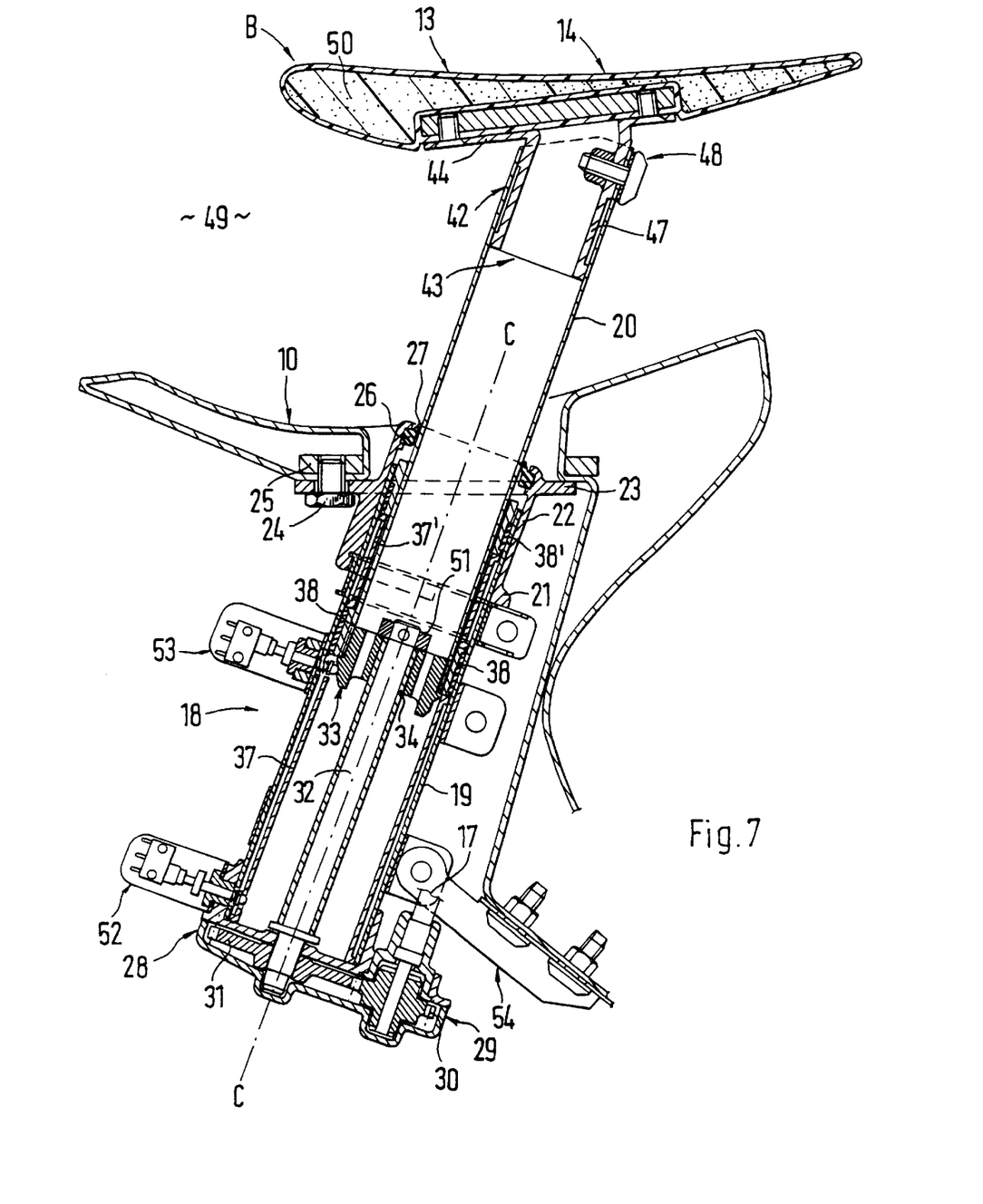
FIG. 7 is a sectional view through the extending device for the rear airfoil, but with the rear airfoil extended.

The tubes (i.e., the inner tube and outer tube) are made of steel or aluminum. The linear extending movement of the telescopic extender 18, 18' takes place along a diagonal plane C—C (FIG. 7). In the extended operating position B of the rear airfoil 5, a flow channel area 49 extends between the bottom 11 of the rear airfoil 5 and the groove-shaped receptacle 10. As a result, a considerable increase in downforce occurs on the rear axle for the motor vehicle.

The rear airfoil 5 is extended or retracted as a function of speed. The extension of the rear airfoil 5 is necessary only above a speed between 80 and 130 km/h. Below this speed, the fixed rear spoiler 4 will suffice for the necessary downforce. Depending on the required extension travel and the available space, the telescopic extender 18, 18' can include more tubes than only an outer tube and an inner tube.

Plastic tubes can also be used for the telescopic extenders 18, 18' instead of steel and aluminum. In such case, elastic bearings 38, 38' and spacing bushings 37, 37' can be eliminated and the retaining part 21 made integral with the outer tube 19. In addition, the housing upper part 35 of the spur gear drive 28 can be made integral with outer tube 19. The rear airfoil 5 can be formed by a plastic part provided internally with polyurethane foam 50 or the like.

To extend the rear airfoil 5, the drive motor 15 is set in motion and by virtue of the rotary movement of the flexible drive shafts 17, 17', the pinion 30 is caused to execute a rotary movement and drives the gear 31. The rotary movement of the gear 31 moves the spindle 32. The fixed lifting nut 33 produces the extending movement of the inner tube 20 which supports rear airfoil 5.

Figure 6:
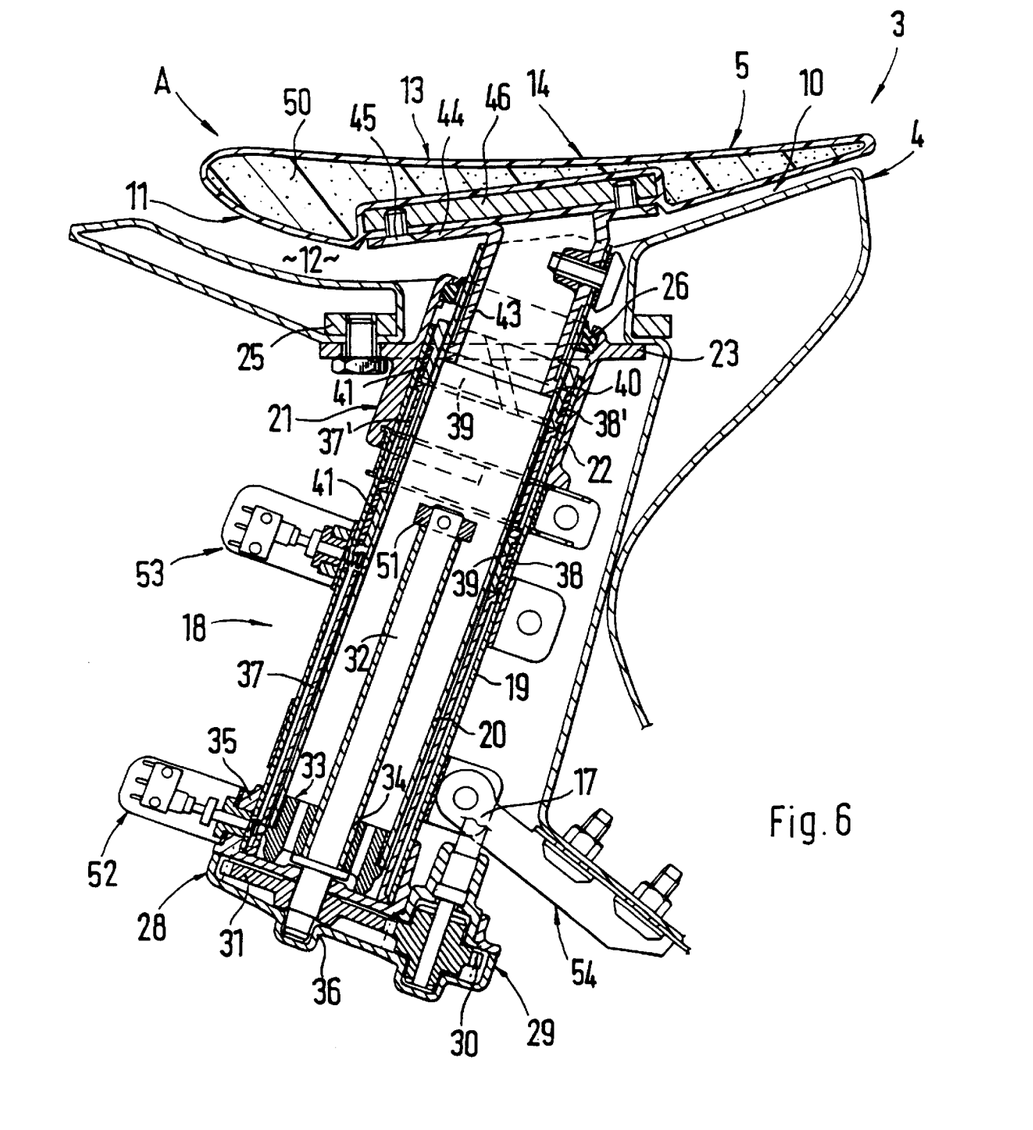
FIG. 6 is a sectional view through the extension device for the rear airfoil, with the rear airfoil retracted.

In order to ensure a specific extension height and to prevent the lifting nut 33 from striking the stop 51, microswitches 52, 53 with end-position recognition are provided on the telescopic extenders 18, 18'. The lower microswitch 52 defines the lower endpoint, and the upper microswitch 53 defines the upper endpoint of the height adjustment of the telescopic extender 18, 18'. If the lifting nut 33 goes beyond the switching point of the respective microswitch 52, 53, the drive motor 15 is shut off. Afterrunning and inertia allow the lifting nut 33 to continue moving until shortly before the stop is reached. FIGS. 6 and 7 show that a lower holder 54 can be provided next to the upper holder 21 to secure the telescopic extender 18, 18'. The lower holder 54 is articulated with the outer tube 19 and is held in place on the rear spoiler 4 by screws.

Figure 5:
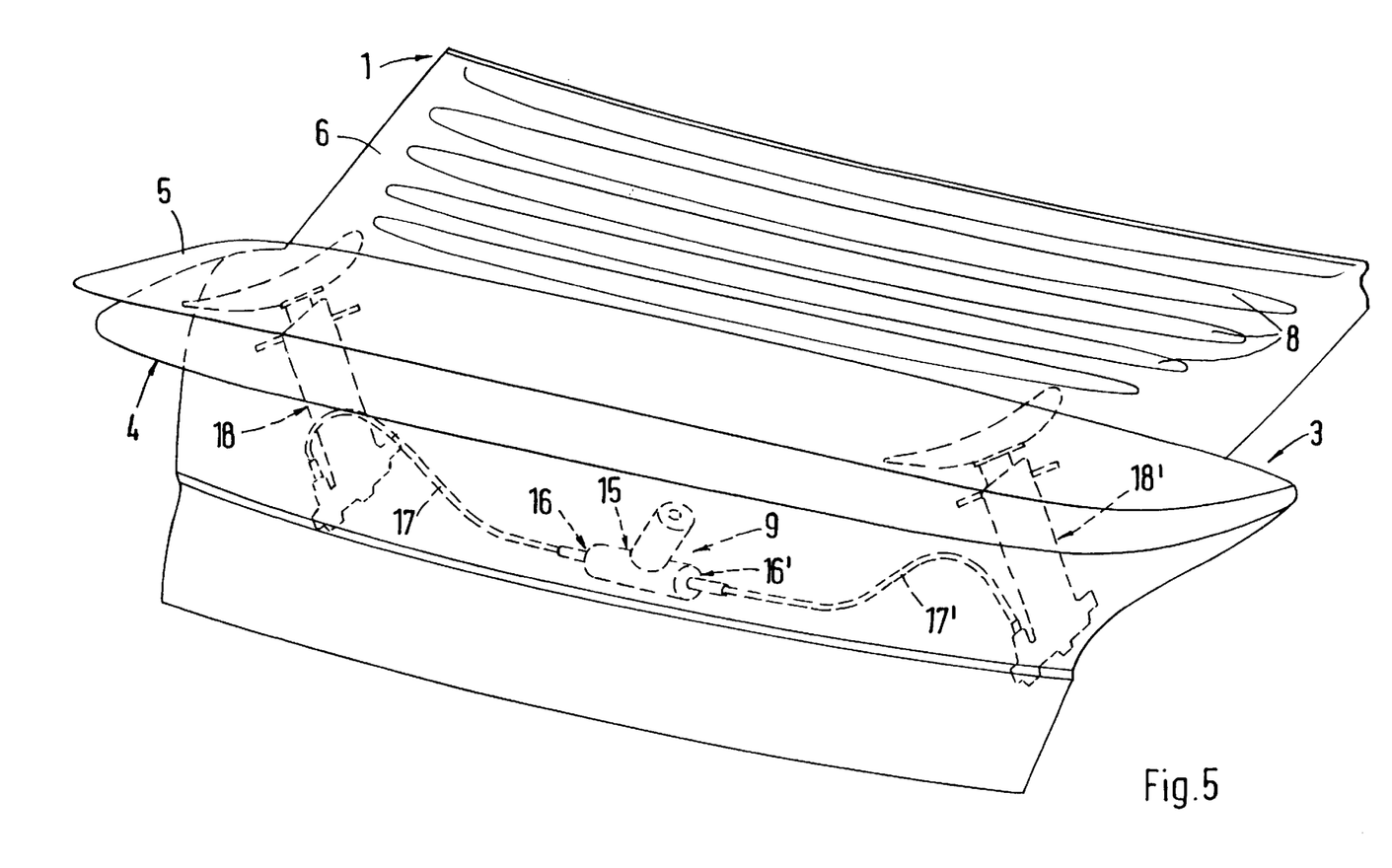
FIG. 5 is a perspective view diagonally from the rear of the air guide device and the drive device for the rear airfoil.
Figure 8:
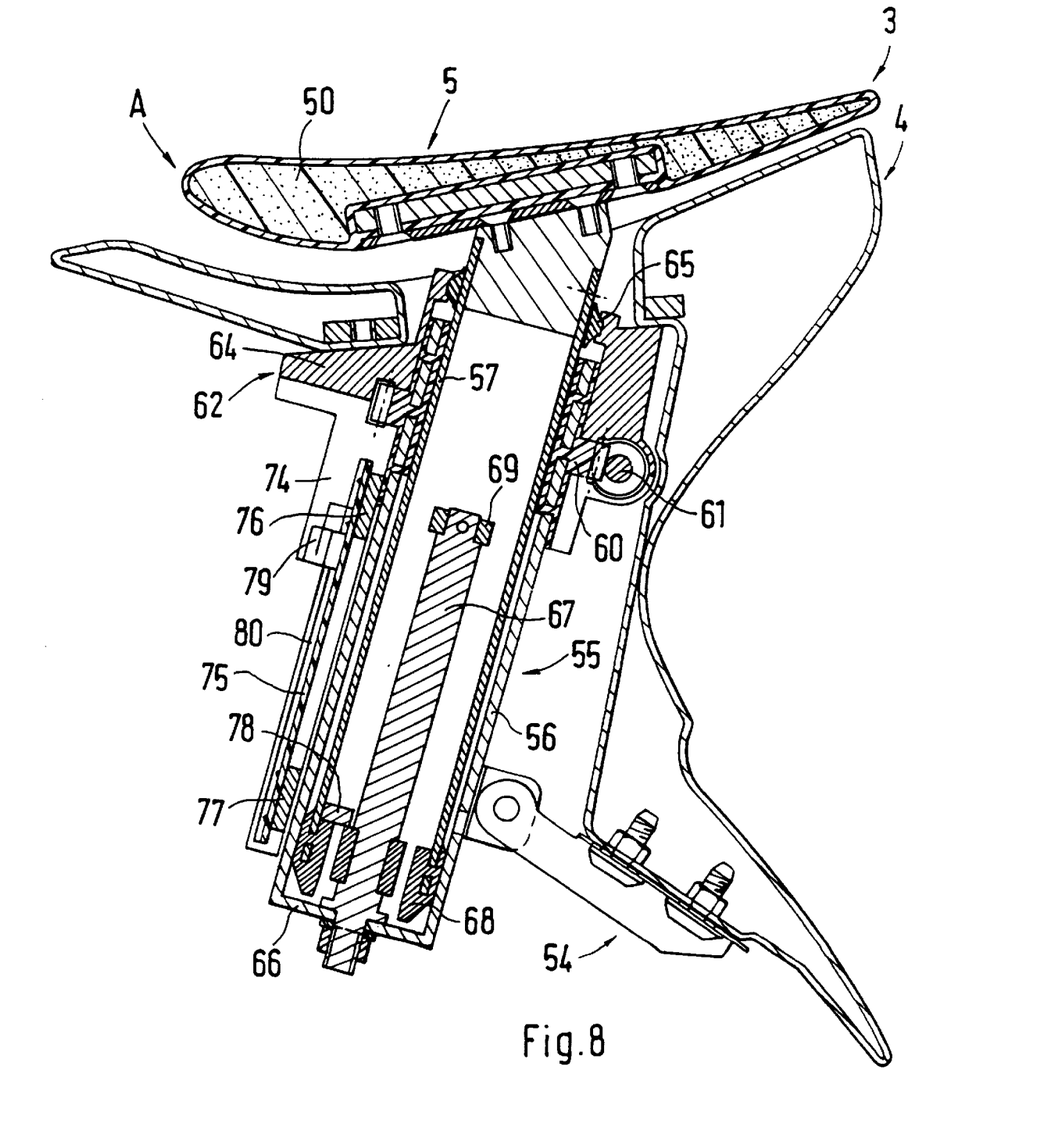
FIG. 8 is a sectional view similar to FIG. 6 with a second embodiment of the telescopic extender with the rear airfoil retracted.
Figure 9:
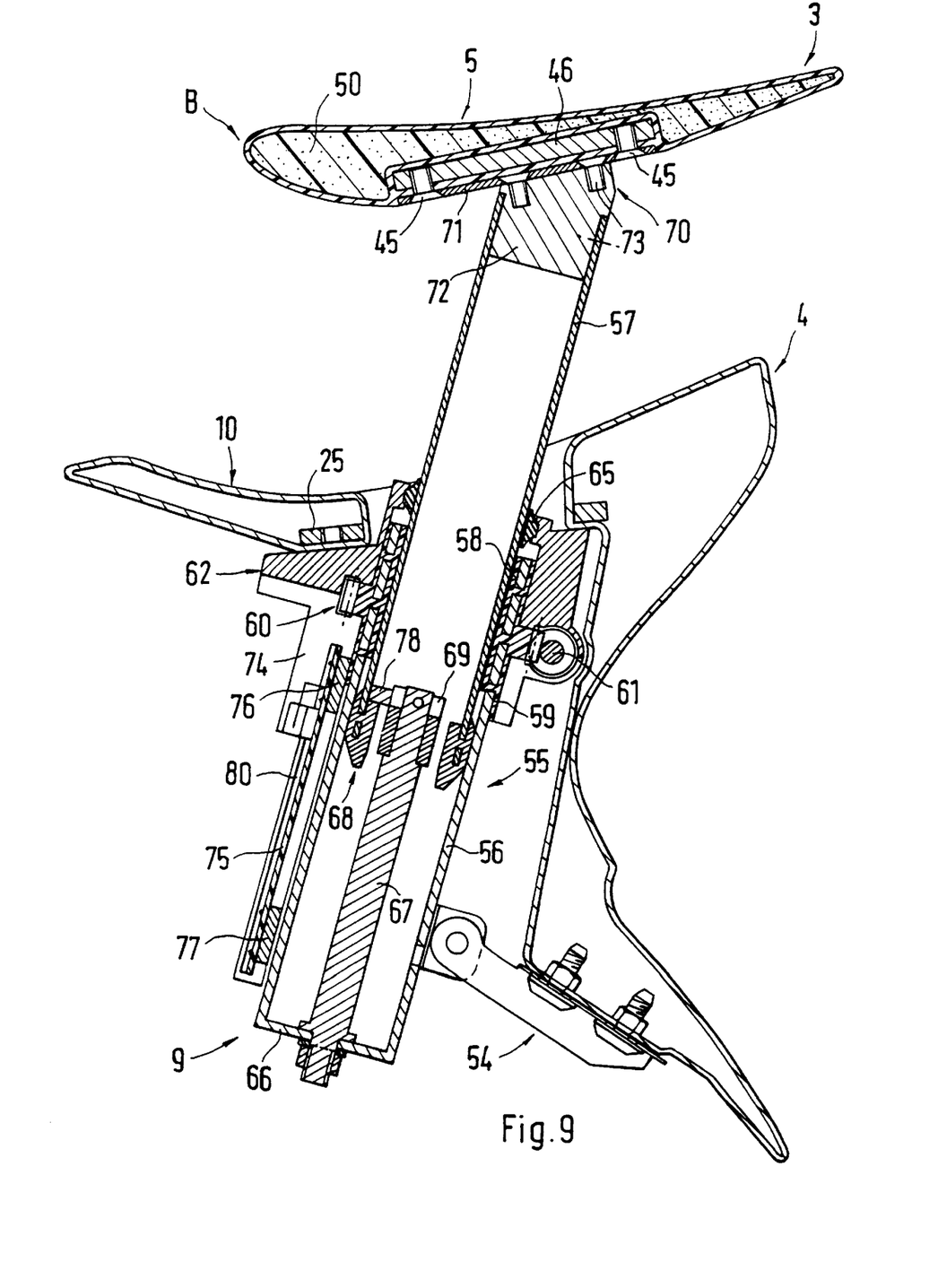
FIG. 9 is a sectional view smaller to FIG. 7 with a second embodiment of the telescopic extender, but with the rear airfoil extended.

The configuration of the air guide device 3 shown in FIGS. 8 and 9 corresponds precisely to the above-described first embodiment and includes a fixed rear spoiler 4 and a deployable rear airfoil 5. The air guide device 3 is as well movable by a drive device 9 from a retracted resting position A (FIG. 8) into an extended operating position B (FIG. 9) and vice versa. The drive device 9 likewise comprises, as shown in FIG. 5, an electric drive motor 5 located approximately centrally as viewed in the transverse direction of the vehicle. The motor 5 has two outputs 16, 16', and with one end of a flexible drive shaft 17, 17' being brought out from each output 16, 16', with the other external end of each shaft being connected with a telescopic extender 55, 55' supporting rear airfoil 5.

In FIGS. 8 and 9, only the telescopic extender 55 is shown. Each telescopic extender 55, 55' comprises a rotatably mounted outer tube 56 and an inner tube 57 displaceable heightwise. The outer tube 56 has an inner guide bushing 58 and an outer guide busing 59 in an upper marginal area. Both guide bushings 58, 59, preferably made of a suitable plastic, are injection formed on outer tube 56 and are permanently and form-lockingly connected to one another locally through material extending into radial openings in the outer tube 56 as a result of the injection forming.

A worm wheel gear 60 is connected integrally with the outer guide sleeve 59. The gear 60 is in an operating connection with a worm shaft 61 of an upper retaining part 62. The worm shaft 61 is force-transmittingly connected with the end of the flexible drive shaft 17, 17'. The worm shaft 61 is rotatably mounted in the upper retaining part 62 for outer tube 56 that is made in two parts. Upper retaining part 62 is fastened by screws to a threaded plate 25, inserted above, of rear spoiler 4.

A wiper ring 65 is held in place in a groove at the upper edge of an upper part 64 of retaining part 62. The ring 65 is in an operating connection with the outside of the inner tube 57. The rotatable outer tube 56 is mounted in a lower area of its vertical extent by a holder 54 to the fixed rear spoiler 4 as well.

At a bottom section 66 of the outer tube 56 a spindle 67 is fastened and extends in the vertical direction inside the outer tube 56. The spindle 67 is permanently connected with the bottom section 66 and cooperates with a plastic lifting nut 68. The nut 68 is permanently attached to the lower marginal area of the inner tube 57. The bottom section 66 can be made integral with the outer tube 56 or can be formed by a separate part which is permanently attached to the outer tube 56.

The plastic lifting nut 68 is injected onto the inner tube 57. The outside of the lifting nut 68 cooperates in a sliding manner with the inside of the outer tube 56. A stop 69 is provided at the upper end of the spindle 67. The inner tube 57 is connected at its upper end by a one-piece or multi-part mounting part 70 with the rear airfoil 5.

In FIGS. 8 and 9, a plate-shaped upper part 71 of mounting part 70 is secured by screws 45 to a threaded plate 46 in the rear airfoil 5. A lower part 72, which in portions matches the shape of the inner tube 57, is inserted into the interior of the inner tube 57 and is screwed thereinto. The plate-shaped upper part 71 is connected with the lower part by fastening screws 73.

To detect the two end positions of each telescopic extender 55, 55', a board 75 is located on a lower part 74 of the upper retaining part 62. The board 75 has two reed contacts 76, 77 spaced apart from one another. The reed contacts 76, 77 are actuated by a permanent magnet 78 on the lifting nut 68. The magnetic field generated by permanent magnet 78 acts through the rotating outer tube 56 on the reed contacts 76, 77. Because the lifting nut 68, in contrast to outer tube 56, does not rotate, the permanent magnet 78 moves linearly as the rear airfoil 5 is moved from the retracted resting position A into the extended operating position B. Thereby, with the aid of the first reed contact 76, the operating position B can be detected and with the aid of the second reed contact 77, the resting position A can be detected.

To protect against corrosion, the board 75 is accommodated in a cavity 80 in the lower part 74. In addition, a plug contact 79 is located externally on the lower part 74 and is electrically connected with the board 75. Traces provided on the board 75 connect the plug 79 with the reed contacts 76, 77. The plug contact 79, like both reed contacts 76, 77, is soldered to the board 75.

In the resting position A, the permanent magnet 78 comes to rest opposite the second reed contact 77, so that this contact effects switching. In the operating position B, the permanent magnet 78 comes to rest opposite the first reed contact 76 and effects switching at that contact. With the aid of the signals supplied by reed contact 76, 77, a conventional control device actuates an electric motor provided as a drive device and connected with the worm shaft 61.

Figure 10:
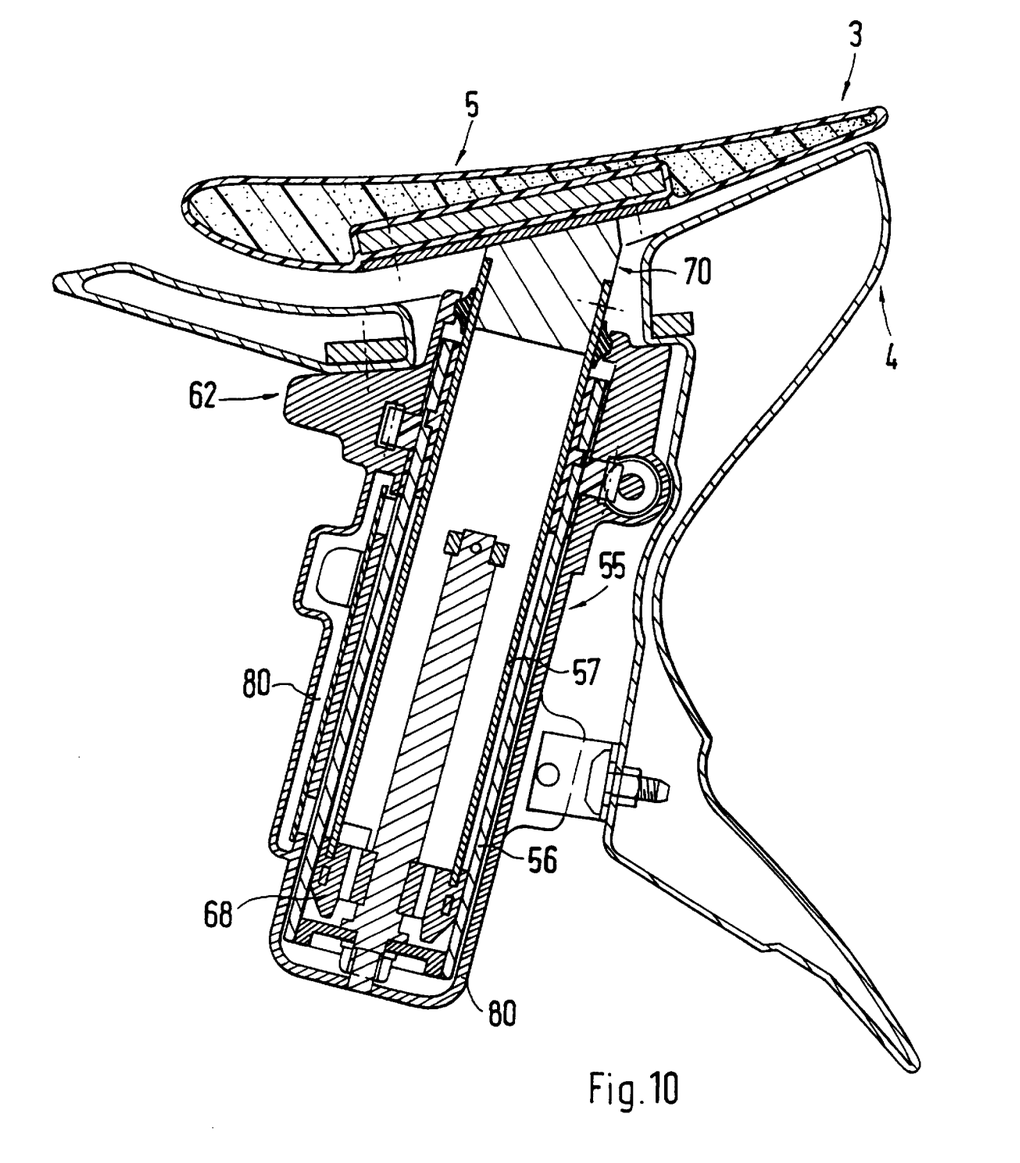
FIG. 10 is a sectional view similar to FIG. 8, but with the telescopic extender provided with an additional outward housing.

The third embodiment shown in FIG. 10 with the closed lower part 74 is constructed in the above-described manner as relates to FIGS. 8 and 9. Telescopic extenders 55, 55' for the air guide device 3 differs, however, in that the rotating outer tube 56 is shielded from the outside by an additional tubular housing 80.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rear air guide device for a motor vehicle, comprising a rear spoiler provided on a rear hood portion of the vehicle and a rear airfoil connected therewith, wherein the rear airfoil is configured to be movable via a drive device between a retracted resting position into an extended operating position, with the rear airfoil in the resting position being substantially lowered into a complementary curvilinear groove-shaped receptacle provided on top of the rear spoiler.

2. The device according to claim 1, wherein, in the resting position, a top of the rear airfoil forms a surface for flowing air over the rear of the vehicle.

3. The device according to claim 2, wherein the rear airfoil in the resting position defines a narrow gap with respect to the receptacle in the rear spoiler.

4. The device according to claim 1, wherein the drive device comprises a central drive motor operatively connected via flexible drive shafts with two telescopic extenders to support the rear airfoil.

5. The device according to claim 4, wherein each of the telescopic extenders comprises at least one fixed outer tube and an heightwise displaceable inner tube, with the outer tube being connected with the fixed rear spoiler and the inner tube being connected with the rear airfoil.

6. The device according to claim 5, wherein the outer tube is held at its upper marginal area with interposition of an upper retaining part on the rear spoiler.

7. The device according to claim 5, wherein a spur gear drive is flanged to the lower edge of the outer tube, a pinion is operatively connected with the flexible drive shaft and meshes with a gear which is rigidly connected with an upright spindle, said spindle cooperating with a lifting nut fastened to the inner tube.

8. The device according to claim 5, wherein spacing bushings and elastic bearings are interposed locally between the outer tube and the inner tube.

9. The device according to claim 8, wherein each of the elastic bearings comprises a slotted bearing bushing slid onto the inner tube, and a rubber ring is configured to be inserted into an outer turned groove in a bearing bushing and to slidingly cooperate with the interior of the outer tube.

10. The device according to claim 9, wherein a wiper ring with an elastic sealing lip is located between an upper retaining part and the outside of the inner tube.

11. The device according to claim 9, wherein a mounting part is configured to be inserted into an upper end of the inner tube, and a projecting plate-shaped section of the mounting part is operatively connected with the rear airfoil.

12. The device according to claim 4, wherein each of the telescopic extenders comprises a rotating outer tube operatively connected with the drive device and an inner tube vertically linearly displaceably arranged, the outer tube being rotatably mounted on the rear spoiler and the inner tube being connected with the rear airfoil.

13. The device according to claim 12, wherein a vertically extending spindle is operatively arranged at a bottom section of the outer tube and is permanently connected with the bottom section, said spindle further cooperating with a lifting nut permanently attached to the lower marginal area of the inner tube.

14. The device according to claim 12, wherein an upper end of the inner tube is connected by a fastening part with the rear airfoil.

15. The device according to claim 12, wherein the outer tube is rotatably mounted on at least one upper retaining part, and the retaining part is permanently attached to the rear spoiler.

16. The device according to claim 13, wherein the upper retaining part comprises two parts arranged one above the other.

17. The device according to claim 15, wherein the outer tube has an inner guide bushing and an outer guide bushing in an upper marginal area, and a worm wheel connected with the outer guide bushing and meshing with a rotatably mounted worm shaft said at least one upper retaining part, said worm shaft being driven by said respective flexible drive shaft of the drive device.

18. The device according to claim 15, wherein a permanent magnet is provided on the inner tube, and magnet actuating reed contacts are operatively mounted outside the outer tube.

19. The device according to claim 18, wherein the reed contacts are operatively mounted on the retaining part and are soldered to a board and a plug, said board forming an electrical connection between the reed contacts and the plug, and the board being accommodated in a cavity provided in the retaining part.

20. A motor vehicle in combination with a rear air guide device for a motor vehicle, comprising a rear spoiler provided on a rear hood portion of the vehicle and a rear airfoil connected therewith, wherein the rear airfoil is configured to be movable via a drive device between a retracted resting position into an extended operating position, with the rear airfoil in resting position being substantially lowered into a complementary-curvilinear groove-shaped receptacle provided on top of the rear spoiler.

* * * * *